J. & St. Clair. Gum,
Cultivator.
No. 30,960. Patented Dec. 18, 1860.
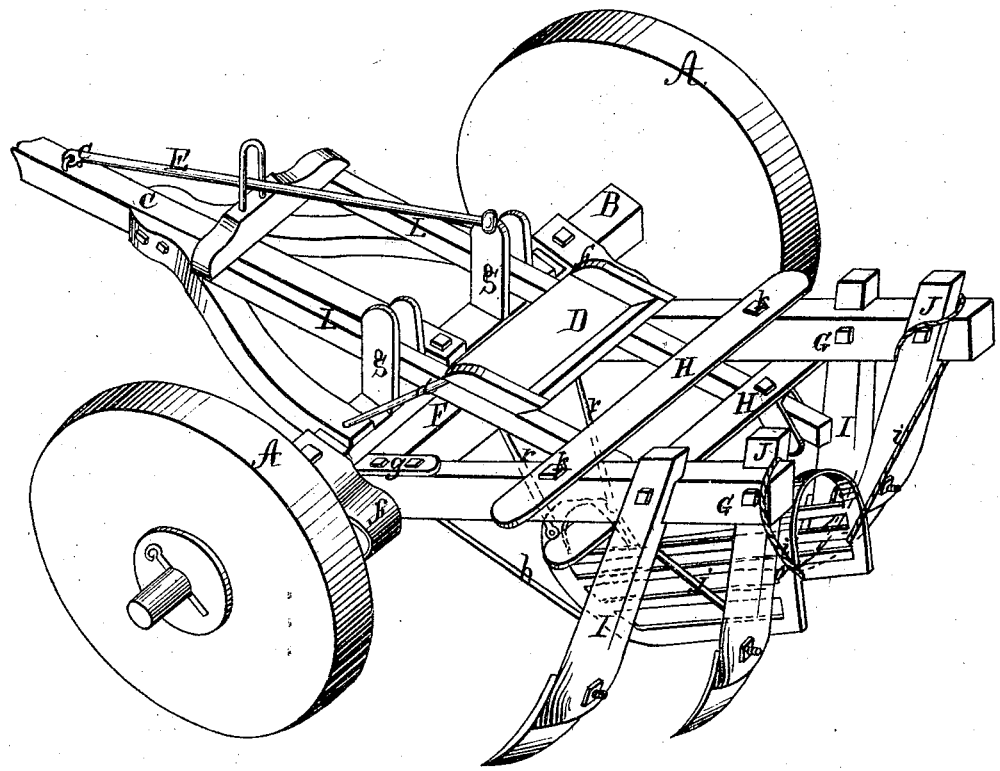
Witnesses.
Augustus Pohlers
W. Yorke At Lee
Inventors.
Joseph Gum
St Clair Gum
Per O. S. X Peck
Atty

UNITED STATES PATENT OFFICE.

JOSEPH GUM AND ST. CLAIR GUM, OF MARSEILLES, ILLINOIS.

IMPROVEMENT IN CULTIVATORS.

Specification forming part of Letters Patent No. 30,966, dated December 18, 1860.

*To all whom it may concern:*

Be it known that we, JOSEPH GUM and ST. CLAIR GUM, of Marseilles, La Salle county, and State of Illinois, have invented new and useful Improvements in Cultivators or Corn-Plows; and we do hereby declare that the following is a full and exact description thereof, reference being had to the accompanying drawings, constituting a part of this specification, in which—

Figure 1 is a view thereof from the rear with the tongue somewhat elevated, and Fig. 2 is a view thereof from the left rear thereof.

Our improvements relate to a new and improved arrangement of parts by which to elevate the several plows or cultivators from the ground, and to move them laterally to the right or left, as the irregularity of the planting of the rows of corn may require, and to such an arrangement of parts as permits the cultivation of two rows of corn at once.

That others skilled in the art may make and use our invention, we proceed to state its manner of construction and principle of operation.

It is carried upon two wheels, A A, which, when the corn is small, may be of the diameter of the fore wheels of a one-horse wagon; but when the corn is of greater growth wheels of greater diameter may be used to prevent breaking down any of the stalks of the row of corn that the machine passes over.

The frame-work of the front part of the machine consists of the axle B, the tongue C, the hounds c c, which are made fast to the tongue, the driver's seat D, which is supported on two metallic braces, d d, which pass from the axle up and are bent under the seat, and to which it is made fast, and the lever E, which is hinged at its lower end to the tongue at e.

The rear part of this machine, or that part of it principally behind the axle, is constructed as follows—that is to say: of the piece F, which is hinged to the axle by the metallic hinges f f; of the pieces G G, extending backward from the piece F, to which they are attached at g g by the metallic straps, (so marked,) and which serve also as hinges in which they respectively swing in their lateral motions; of the pieces H H, which cross the pieces G G, and to which they are fastened by such joints, k, as permit the free lateral movement of the said pieces G G, that carry the plows or cultivators; of the uprights or pieces to which the cultivator or plow blades are attached, (marked I I.) The two outer pieces, I I, are fastened onto the pieces G G at such an angle from the perpendicular plane of said pieces G, or may be so curved as to throw their respective lower ends considerably outward of the perpendicular line of the pieces G, and they are respectively braced by the metallic braces h h to their respective pieces G, which braces pass through said uprights, and are fastened by a swinging joint at the other end to the lower side of the hinges g g, in such manner as to permit the free lateral motion of said plows. Of the uprights or pieces carrying the two inner plows, (marked J J,) which are fastened to the other side of the pieces G G, and about six inches in rear of the pieces or uprights I I, and at such respective inclinations inwardly or may be so curved as to correspond with the inclinations outwardly of the pieces I I, so that there is about an equal distance between the several furrows made by the respective plows, and the pieces J J are respectively braced by the metallic braces j j to the bolts that hold the pieces H in their respective positions, and in such a manner as admits of the free lateral motions of the plows.

The plows are controlled in their perpendicular and lateral movements by a compound leverage executed in the following manner and by the use of the following-described parts—that is to say: On the axle of the machine, and just inside of the hounds of the tongue are two open slotted standards, which are held in their respective positions by nuts on the lower side of the axle, but are so loose in their respective holes as admits of a free revolving motion in them, and they are marked S S, and in their slots are fastened on suitable fulcrum-pins the levers L L, as represented in the drawings, which levers extend back through similar slots extending downward from the lower side of the lower piece, H, which slots also freely revolve in their holes. The levers L have a cross-piece framed across their front end, where it is held in position by screw-bolts, and from the middle of this cross-piece is raised a closed slotted metallic standard, through which lever E, heretofore mentioned, extends from near the front of the driver's seat to where it is hinged to the tongue of the machine, and a metallic fender, T—such as is shown in the model and drawings—is suspended between the two inner plows on two swinging rods hung on screw-bolts that are screwed into the levers L L just in rear of the piece F, and they are permitted to move backward and forward so freely as always to allow the fender to pass freely on the surface of the ground, and the rear part of the fender is kept in position by two straps, cords, or small chains made fast to the rear ends of the pieces G, respectively, and to the respective outside rear ends of the fender; but they are sufficiently long to permit a moderate lateral swing of the fenders. The swinging rods are marked r r, and the straps or chains are marked i i.

It will be observed on the model and in the drawings that the piece F is perforated with two series of holes suitable for the bolts of the straps g g, and that the pieces H H are also perforated with two series of holes of a size suitable for bolts that hold the cross-pieces aforesaid to the pieces G, the object of which is to permit the change of the distance apart of the furrows made by the right-hand and the left-hand plows, as by placing the bolts of the straps in the inner holes the distance apart of the series of plows before mentioned is increased, and by changing them back to the outer holes and placing the bolts in the cross-pieces in the inner holes in them the plows will be brought nearer together.

The driver having taken his seat, with one hand regulates the motion of the plows, as, in going from place to place, or in passing over obstructions, or backing it, by pressing on the lever he elevates the plows from the earth, and to accommodate the path of the plow to any irregular planting by pressing on one side or the other of the lever he moves the plows in the desired lateral direction, using the fender only when the corn is young and removing it after it has grown larger and stronger, its purpose being to protect the young and tender shoots of corn from being covered by masses of loose dirt, while it permits fine dirt to fall between its slats, and also from being covered by heavy pieces of earth that may be raised by the plows.

This machine is called a corn cultivator or plow; but it is obvious that it will serve equally well for the cultivation of other crops requiring similar treatment.

Having thus stated our invention, what we claim therein as new, and desire to secure by Letters Patent, is—

1. The lever E, in combination with the levers L L, the open-slot standards S S, and the slots on the lower side of the lower cross-piece, H, by which to control the movements of the plows, when arranged as set forth, and substantially as is described.

2. The driver's seat D, in combination with the several elements of the preceding claim, when arranged as set forth, and substantially as described.

In testimony of which invention we hereunto set our hands.

JOSEPH GUM.
ST. CLAIR GUM.

Witnesses:
DANIEL WARD,
LYMAN PITCHER.